US007007492B2

(12) United States Patent  
Burger

(10) Patent No.: US 7,007,492 B2
(45) Date of Patent: Mar. 7, 2006

(54) AIR CONDITIONING SYSTEM

(76) Inventor: Richard A. Burger, 29820 450th St., Moravia, IA (US) 52571

( * ) Notice: Subject to any disclaimer, the term of this patent is extended or adjusted under 35 U.S.C. 154(b) by 59 days.

(21) Appl. No.: 10/633,384

(22) Filed: Aug. 1, 2003

(65) Prior Publication Data
US 2004/0020237 A1   Feb. 5, 2004

Related U.S. Application Data

(63) Continuation-in-part of application No. 10/120,568, filed on Apr. 11, 2002, now Pat. No. 6,604,373.

(51) Int. Cl.
F25D 15/00 (2006.01)
(52) U.S. Cl. ............................ 62/237; 62/448
(58) Field of Classification Search ............... 62/237, 62/238.6, 260, 324.1, 448
See application file for complete search history.

(56) References Cited

U.S. PATENT DOCUMENTS

| 272,654 | A | | 2/1883 | Cogswell | |
|---|---|---|---|---|---|
| 547,995 | A | | 10/1895 | Iliowizi | |
| 600,943 | A | | 2/1898 | Bosmann | |
| 665,389 | A | * | 1/1901 | Bosmann | 62/242 |
| 1,191,017 | A | | 7/1916 | Marshall | |
| 1,887,580 | A | * | 11/1932 | Copeman | 62/118 |
| 2,298,896 | A | | 10/1942 | Meyer | |
| 2,342,211 | A | | 2/1944 | Newton | |
| 3,693,370 | A | * | 9/1972 | Miller | 62/175 |
| 4,011,736 | A | | 3/1977 | Harrison | |
| 4,240,268 | A | | 12/1980 | Yuan | |
| 4,346,569 | A | | 8/1982 | Yuan | |
| 4,409,798 | A | | 10/1983 | Yuan | |
| 4,843,827 | A | * | 7/1989 | Peppers | 62/73 |
| 5,246,061 | A | | 9/1993 | Zalite | |
| 5,762,129 | A | | 6/1998 | Elliott | |
| 6,604,373 | B1 | * | 8/2003 | Burger | 62/237 |

FOREIGN PATENT DOCUMENTS

DE         2450537 A1 *  5/1975

* cited by examiner

Primary Examiner—Melvin Jones
(74) Attorney, Agent, or Firm—McKee, Voorhees & Sease, P.L.C.

(57) ABSTRACT

A natural and environmentally friendly cooling system is disclosed. The cooling system includes an insulating enclosure, a block of ice within the insulating enclosure, a primary coil of tubing contacting the block of ice and beneath the block of ice for transferring fluid, a return coil of tubing beneath the block of ice for transferring fluid, and a floor pan for collecting water beneath the primary coil and the return coil. The enclosure can include sloped walls to facilitate freezing of water within the enclosure. Alternatively, the block of ice can be delivered via a service.

17 Claims, 6 Drawing Sheets

AIR CONDITIONING SYSTEM

CROSS-REFERENCE TO RELATED APPLICATIONS

This application is a continuation-in-part of U.S. patent application Ser. No. 10/120,568 filed on Apr. 11, 2002 now U.S. Pat. No. 6,604,373.

BACKGROUND OF THE INVENTION

The present invention relates to an improved air conditioning system. More particularly, although without limitation, the present invention relates to a natural air conditioning system that does not necessarily rely on fossil fuels and is not otherwise harmful to the environment.

Air conditioning systems have been used for some time. One of the most common problems with conventional air conditioning systems is that they require the use of refrigerants. For example, air conditioning systems have used FREON as a refrigerant. FREON has been widely publicized as an ozone depleting substance. Ozone depletion is recognized as a cause of increased ultraviolet radiation. Increased ultraviolet radiation is linked to a number of environmental and health problems. Therefore, the use of air conditioning systems using FREON is problematic.

In fact, under the Montreal Protocol of 1987, bans and/or limitations on FREON use have been made throughout the world. Further, servicing of cooling systems using these types of refrigerants may legally require certified technicians. Thus, despite FREON and other chlorofluorocarbon (CFC) refrigerants being banned or limited in use, problems remain. In particular, those refrigerants that have replaced FREON are not necessarily environmentally friendly. In fact, some believe that the refrigerants that have replaced FREON are actually more harmful to the environment and to human health than FREON.

Another prior art approach has been to use natural gas air conditioning systems. These systems have been touted as being environment friendly. These systems do not use harmful refrigerants, but instead use water as a refrigerant. The main byproducts of these systems are carbon dioxide and water vapor, thus making the operation of these types of air conditioning systems environmentally clean. Unfortunately, however, problems remain. In particular, the very use of natural gas is problematic. It is well known problem that the world is quickly depleting its limited supply of fossil fuels, including natural gas. The use of natural gas air conditioning systems contribute to this problem. Thus, many problems remain with using conventional refrigerants and conventional techniques.

The inventor has addressed these and other problems by developing the air conditioning system originally disclosed in U.S. patent application Ser. No. 10/120,568, herein incorporated by reference in its entirety. In that disclosure, a block of ice is used in an air conditioning system. Nevertheless, there is room for improvement of such an air conditioning system.

Therefore, it is a primary object, feature, or advantage of the present invention to improve upon the state of the art.

It is a further object, feature, or advantage of the present invention to provide an air conditioning system that is environmentally safe.

It is a further object, feature, or advantage of the present invention to provide an air conditioning system that does not negatively affect human health.

A still further object, feature, or advantage of the present invention is to provide an air conditioning system that does not require use of FREON or other CFC refrigerants.

Yet another object, feature, or advantage of the present invention is to provide an air conditioning system that does not deplete the ozone layer.

It is a further object, feature, or advantage of the present invention to provide an air conditioning system that does not require certified technicians to operate or repair.

Another object, feature, or advantage of the present invention is to provide an air conditioning system that does not require the use of natural gas or other fossil fuels.

Yet another object, feature, or advantage of the present invention is to provide an air conditioning system that can be located above ground.

A further object, feature, or advantage of the present invention is to provide an air conditioning system that uses movable blocks of ice.

Another object, feature, or advantage of the present invention is to simplify or improve the process of delivering blocks of ice for use in air conditioning systems.

Yet another object, feature, or advantage of the present invention is to simplify or improve the process of freezing water at the location of an air conditioning system.

A further object, feature, or advantage of the present invention is an improved ice chamber for holding ice for use in an air conditioning system.

These and other objects, features, or advantages of the present invention will become apparent from the Specification and Claims that follow.

SUMMARY OF THE INVENTION

The present invention includes an improved air conditioning system. A block of ice is placed within an insulating enclosure. There is a primary coil of pipe or other tubing contacting the block of ice and located beneath the block of ice. The primary coil or tubing transfers fluid to a radiator. There is also a return coil of tubing beneath the block of ice for transferring fluid returning from the radiator. The coils can be any number of materials, including copper. Within the coils is a fluid. The fluid can contain water and antifreeze. The cooling system includes a floor pan for collecting water beneath the coils. In addition, a drain can be connected to a bottom interior surface of the enclosure. As the block of ice cools the primary coil, it very slowly melts so that ice water accumulates at the bottom of the enclosure. A floor pan for collecting water can be positioned beneath the coils. The return coil tubing passes through this ice water so that fluid within the return coil is already cooled when it enters the primary coil. Further, an overflow outlet can be used for draining water overflow from the enclosure.

Another aspect of the present invention includes a method of air conditioning. According to the method, an enclosure is gradually filled with water to be frozen. Preferably the enclosure includes side walls that extend or slope outwardly to facilitate a gradual fill and freeze process. Alternatively, the ice can be formed at a remote location and then transported to the enclosure or otherwise provided. Fluid is then circulated through a coil beneath the block of ice to cool the fluid. The fluid is circulated to a radiator. The fluid is then returned from the radiator through a second coil cooled by water melted from the ice. Thus, in this manner, fluid to the radiator is cooled. A fan is placed proximate the radiator to circulate air that is cooled.

Thus, the present invention provides for numerous advantages. In particular, the present invention does not require use of any fossil fuels or any harmful refrigerants; therefore, the present invention is natural, safe and environmentally friendly.

DETAILED DESCRIPTION OF THE INVENTION

Figure 1:
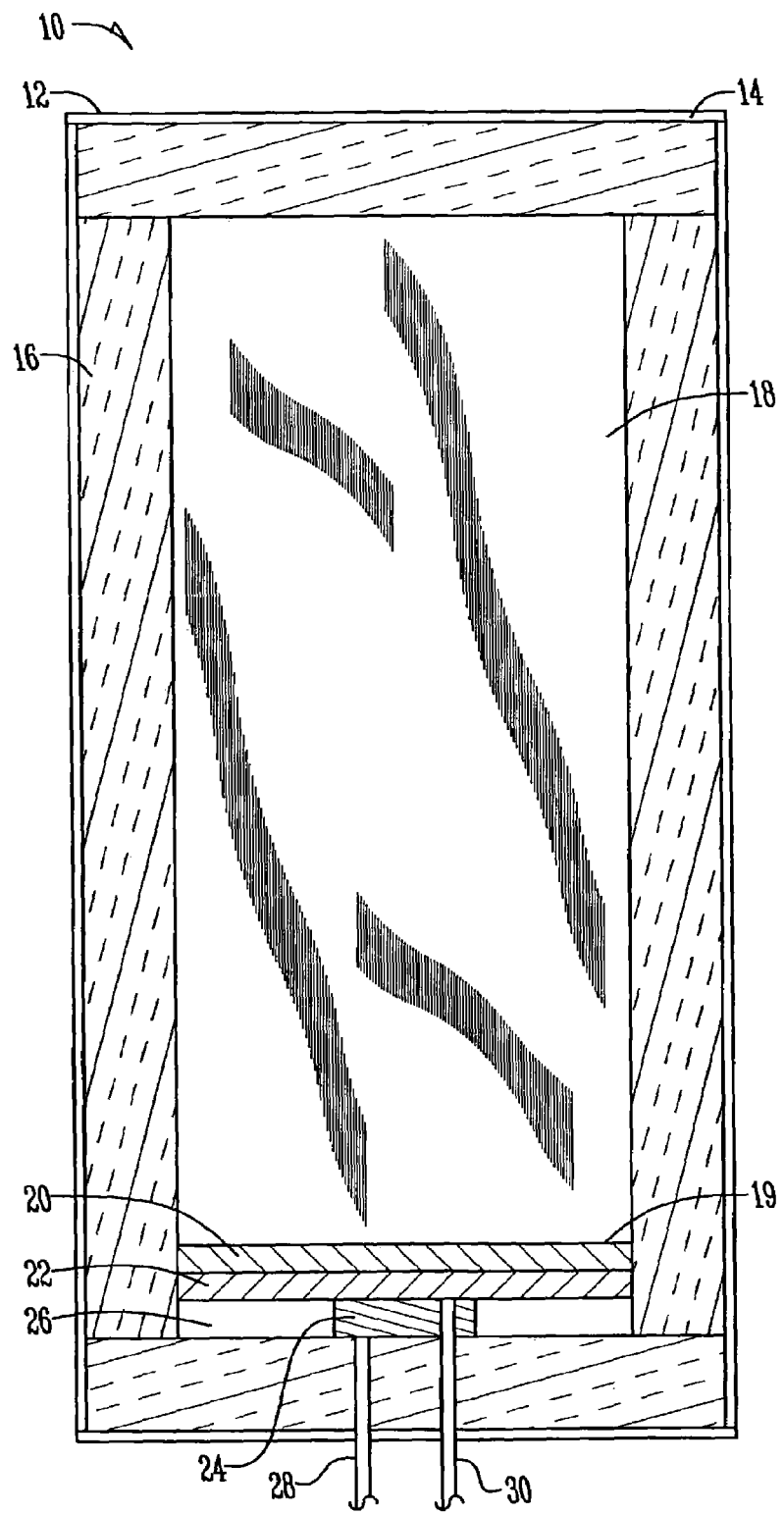
FIG. 1 provides a sectional view of one embodiment of the cooling system according to the present invention.

FIG. 1 provides a sectional view of a cooling system 10 according to the present invention. The cooling system 10 provides an insulating enclosure 12. The insulating enclosure 12 preferably includes an outer layer of wood, such as plywood 14, and an inner layer of styrofoam 16 or other insulative material. Within the insulating enclosure 12 is a block of ice 18. The block of ice 18 has a bottom surface 19.

The block of ice 18 is placed over a primary coil 20. Fluid, such as, but not limited to, water and antifreeze, flows through the primary coil 20. The block of ice 18 cools the fluid within the primary coil 20. The primary coil 20 sits on a grid 22 that provides support. Beneath the primary coil 20 and the grid 22 is a return coil 24. The fluid also passes through the return coil 24. Beneath the grid 22 is a floor pan 26 for collecting melted water from the block of ice 18. The melted water within the floor plan 26 serves to cool fluid in the return coil 24.

A drain pipe 28 is also shown that allows water to be drained from the enclosure 12. In addition, an overflow outlet 30 is provided. The overflow outlet 30 or other structure is used to reduce the amount of water within the floor pan 26 and/or the enclosure 12. Preferably, the outlet 30 is set so that the level of water in the bottom of the enclosure 12 does not rise above the primary coil 20. This maintains the position of the block of ice 18 on top of the primary coil 20 and the accompanying cooling effect on the fluid within the primary coil 20.

Figure 2:
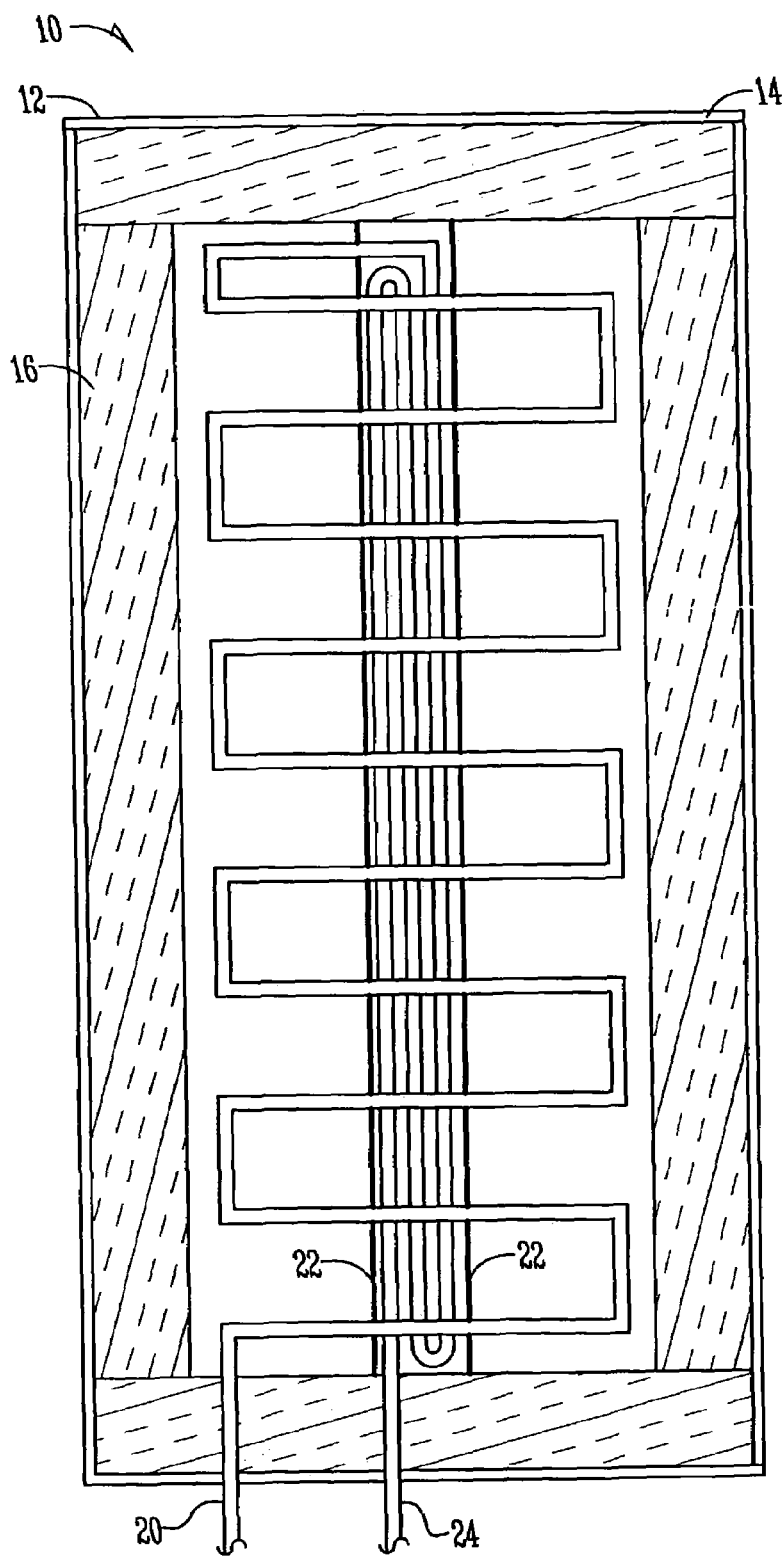
FIG. 2 provides a top view of one embodiment of the cooling system according to the present invention.

FIG. 2 provides a top view looking into the cooling system 10. As shown in FIG. 2, the primary coil 20 winds around so that there is an increased amount of surface contact between the primary coil 20 and the block of ice 18. The grid 22 is a support structure that is located below the primary coil 20. Below the grid 22 is the return coil 24. The return coil 24 contains the fluid after it returns from a radiator.

Figure 3:
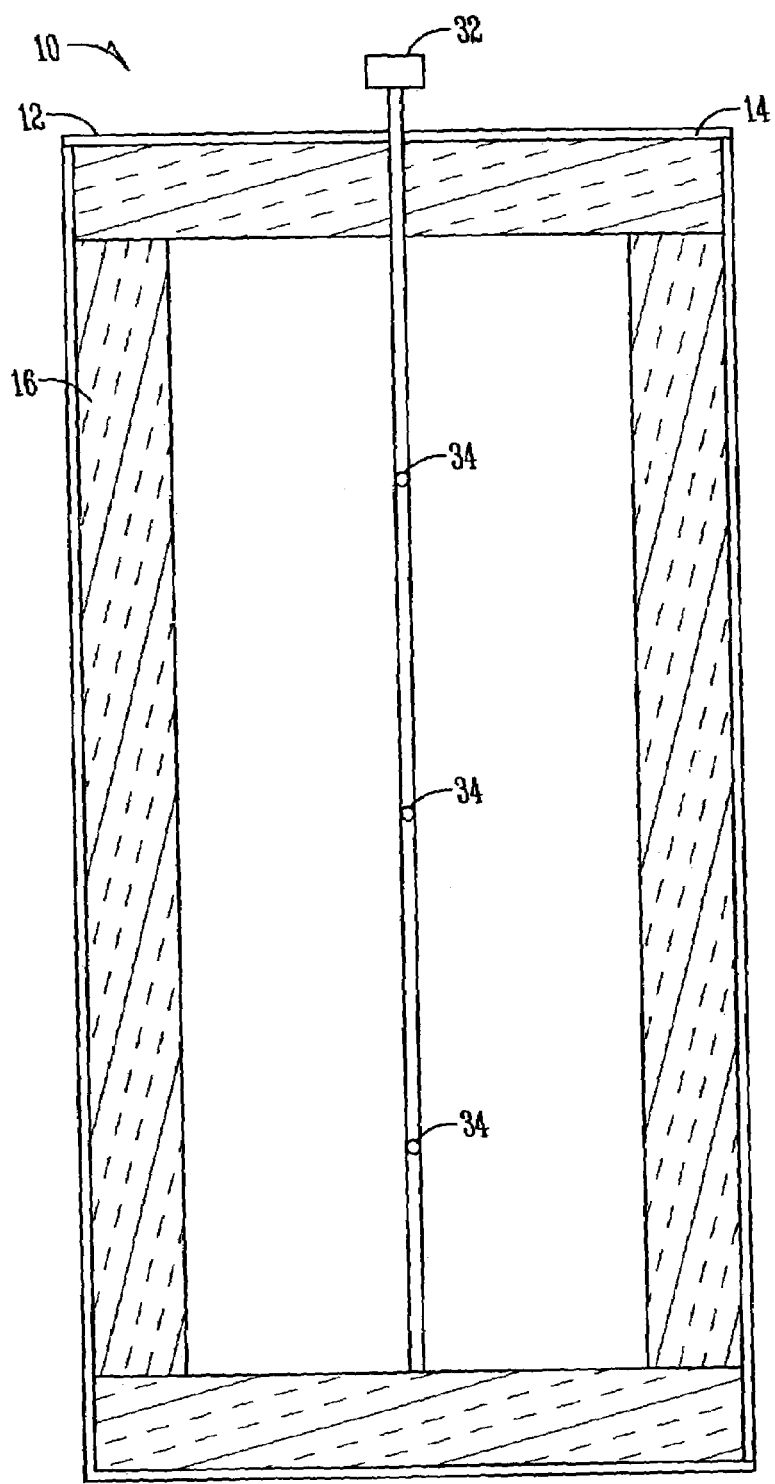
FIG. 3 provides a top view of the enclosure of the present invention being filled.

FIG. 3 shows a top view of the enclosure 12 as the enclosure is being filled with water. A hose is connected to connector 32 to provide water. Sprayers or water application jets 34 are shown that are used to fill the enclosure 12 with water. This configuration is preferred because it allows the enclosure 12 to be filled to an even level. Using jets 34 allow water to be slowly introduced into the enclosure 12 so that the water will freeze to ice as it is applied. The present invention contemplates that the size of the jets can be adjusted according to the ambient temperature. For example, as the temperature gets colder, larger jets are used as water freezes at a faster rate. In addition, the larger flow of water prevents the input line, such as a hose, from freezing. The present invention, however, contemplates that ice can be provided for in other manners as well. For example, ice 18 can be brought to the enclosure from a remote location and placed within the enclosure 12. A service can be provided for delivering ice to enclosures 12 used in homes, businesses, and other installations. The present invention also contemplates that the complete enclosure 12 is transportable. For example, the enclosure 12 is optionally mounted on a chassis so that the enclosure 12 can easily be transported from one location to another, for filling, freezing, or other purposes.

Figure 4:
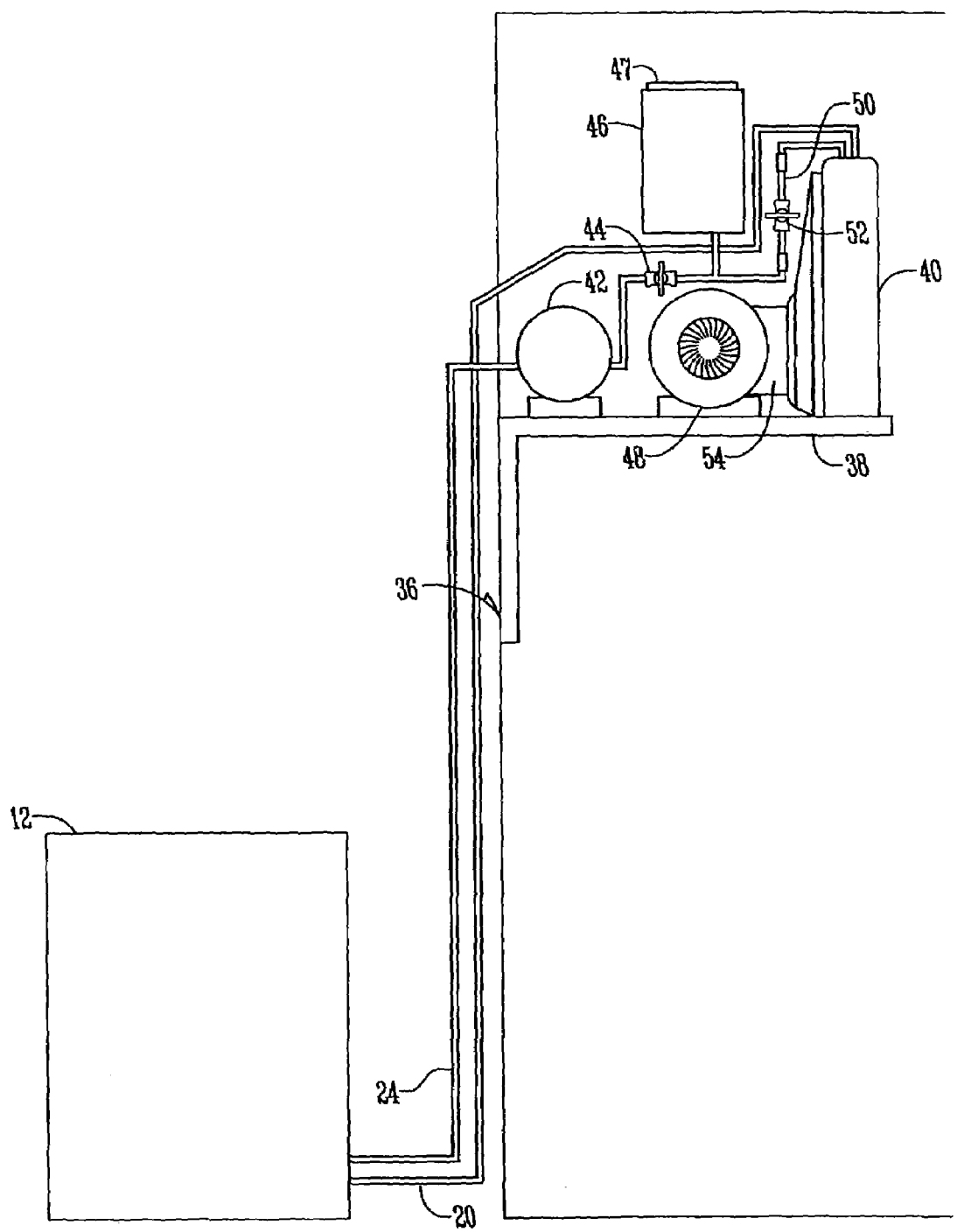
FIG. 4 provides a front view of the cooling system according to one embodiment of the present invention, the cooling system being installed to provide air conditioning to the building.

FIG. 4 provides a diagram of the enclosure 12 as it is connected in one embodiment of an air conditioning system. The primary and return coils (20, 24) are shown providing connections to a radiator 40 placed on a platform 38 within a building (not numbered). A circulation pump 42 is used to force the fluid through the system. The expansion chamber 46 contains fluid to be circulated. The expansion chamber 46 allows coolant within the system to contract and expand as needed. A fill door 47 is provided for filling the expansion chamber 46 with fluid. Preferably the fluid contains water and antifreeze, although other refrigerants can be used. A portion of pipe or tubing 50 is preferably clear so that the level of fluid within the system can be easily monitored at any time so that additional fluid can be added when necessary. A bleed valve 44 is also provided so that air can bleed from the system if necessary. A fan 48 is placed in a position proximate to the radiator 40 in order to circulate air across the radiator 40 to produce cold air. The fan 48 can be a 2-speed squirrel cage fan for efficiency and noise control, although the present invention contemplates that other types of fans may be used. A shroud 54 is preferably connected between the fan 48 and the radiator 40 to increase the amount of forced air going through the radiator 40 and into the building to be cooled. A shut off valve 52 is also shown to shut off the flow of fluid. Thus, in this manner, an air cooling system is provided. The fan 48 and circulation pump 42 are preferably run from an electric motor. Thus, in this embodiment of the present invention, no fossil fuels are required in order to operate the air conditioning system. Although in the embodiment shown a fan and a radiator are shown, the present invention contemplates other variations of evaporators can be used according to the present invention.

As shown in FIG. 4, the enclosure 12 is outside of the building, above ground and readily accessible. Thus, the enclosure 12 can be moved from location to location. To do so, the present invention contemplates placing the enclosure 12 on a chassis or otherwise transporting the enclosure. In addition, ice can be produced in one location and then transported to the air conditioning system according to the present invention. For example, the enclosure 12 can be opened and a new block of ice can be placed therein.

Figure 5:
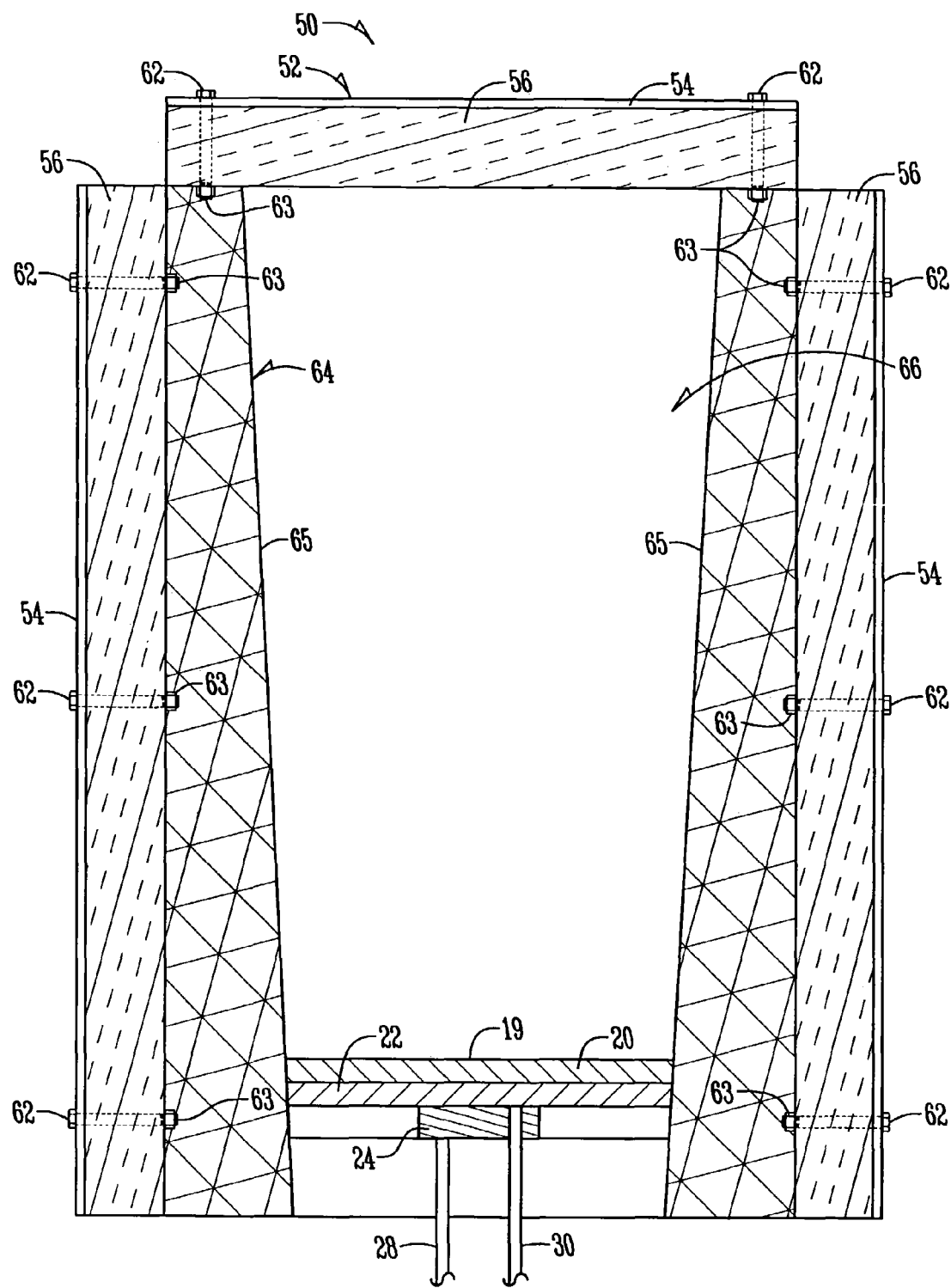
FIG. 5 provides a sectional view of one embodiment of the present invention with an insulating enclosure.

FIG. 5 illustrates another embodiment of the present invention in which the cooling system 50 includes an insulating enclosure 52 formed by surfaces 54 that are insulated by insulation 56. The surfaces 54 can be wooden or made of other materials. The surfaces 54 with insulation 56 are preferably removably attached to an inner enclosure 65. The present invention contemplates that the manner of attachment can take various forms, and uses various attachment means or fasteners. One method of attachment is to use bolts 62 and retaining nuts 63.

The inner enclosure 64 is used to hold water and/or ice. Because in the winter time the inner enclosure 64 is gradually filled with water to be frozen the inner enclosure preferably has side walls 65 that slant or slope outward towards the top of the inner enclosure. This geometry better accommodates the freezing of water.

According to one method of the present invention, in winter time, the surfaces 44 and insulation 56 are removed from the insulating enclosure 52. This will allow water to freeze more quickly. Water is then gradually or periodically introduced into the chamber 66 at a rate to encourage freezing of the water, thus resulting in the chamber 66 retaining a block of ice. Once there is a solid block of ice, the insulation 56 and surface 44 are replaced to insulate the block of ice as winter turns into spring and then to summer, and until a time one desires to use the cooling system.

Figure 6:
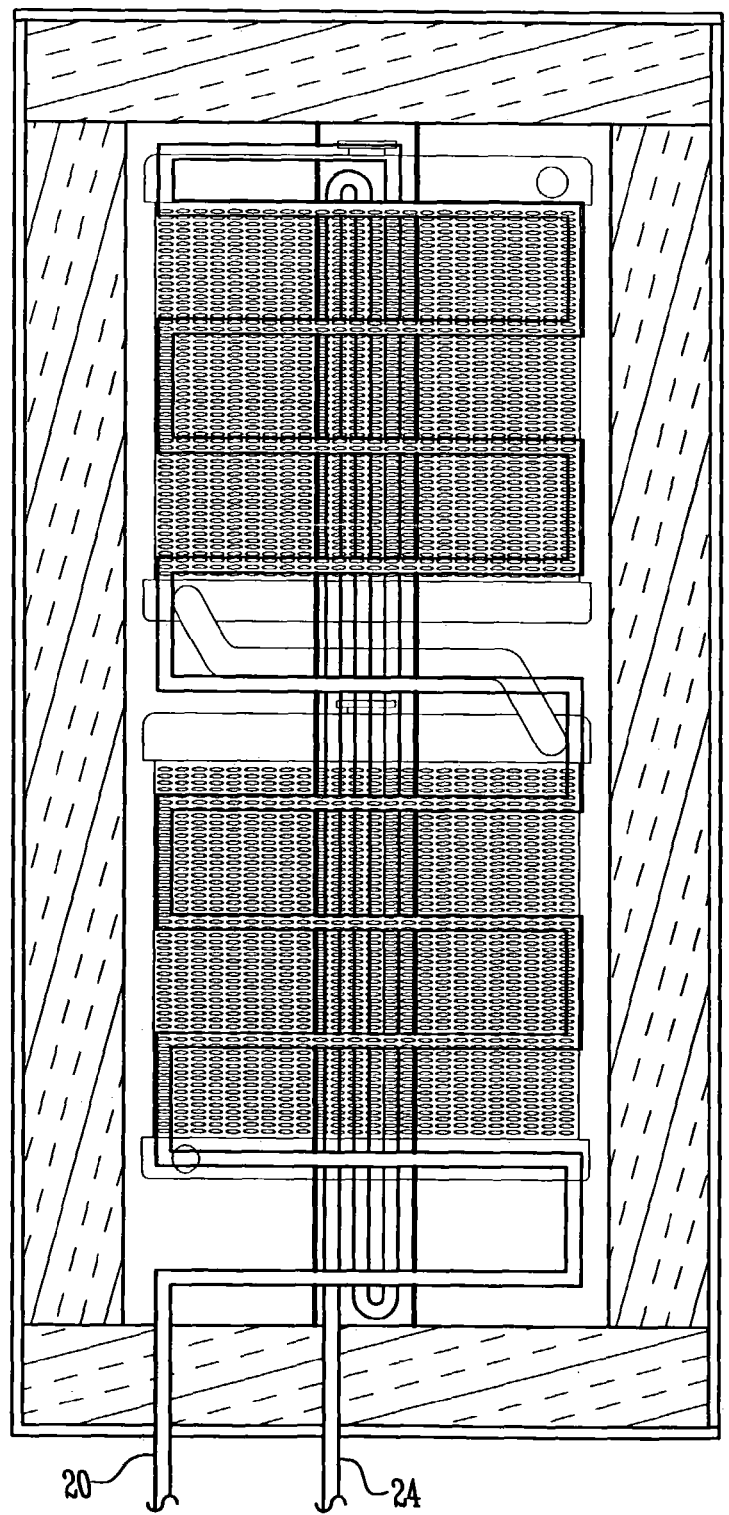
FIG. 6 provides a top view of one embodiment of the present invention.

FIG. 6 illustrates a top view of another embodiment of the present invention.

The present invention contemplates numerous other variations. These include the sizes and proportions of the various structures within the present invention, the types of materials used, the relative placement of components, and other variations within the broad spirit and scope of the invention.

What is claimed is:

1. A cooling system, comprising:
   an insulating enclosure;
   a block of ice within the insulating enclosure;
   a primary coil of tubing contacting the block of ice and beneath the block of ice for transferring fluid;
   a return coil of tubing beneath the block of ice for transferring fluid; and
   a floor pan for collecting water beneath the primary coil and the return coil.

2. The cooling system of claim 1 further wherein the insulating enclosure comprises a bottom wall and a plurality of side walls extending upwardly from the bottom wall.

3. The cooling system of claim 2 wherein at least one of the side walls extends outwardly.

4. The cooling system of claim 1 further comprising a drain connected to a bottom interior surface of the insulating enclosure.

5. The cooling system of claim 1 further comprising an overflow outlet within said insulating enclosure for draining water overflow.

6. The cooling system of claim 1 wherein the fluid includes water and antifreeze.

7. The cooling system of claim 1 further comprising a radiator, the primary coil fluidly connected to an input of the radiator and the return coil fluidly connected to an output of the radiator.

8. The cooling system of claim 6 further comprising a fan proximate the radiator for circulating air across the radiator to cool the air.

9. The cooling system of claim 1 wherein the insulating enclosure includes a layer of styrofoam and a layer of plywood, the layer of styrofoam between the layer of plywood and the block of ice.

10. The cooling system of claim 1 wherein the return coil is cooled by water melted from the block of ice.

11. The cooling system of claim 1 wherein the insulating enclosure is portable.

12. A method of air conditioning comprising:
    gradually filling an enclosure with water to be frozen, the enclosure having side walls extending outwardly and upwardly to accommodate freezing of water;
    freezing the water to form a block of ice within the enclosure;
    circulating fluid through a coil beneath the block of ice to cool the fluid;
    circulating the fluid to a radiator;
    returning the fluid from the radiator through a second coil cooled by water melted from the ice; and
    removing melted ice to maintain the coil adjacent the ice.

13. The method of claim 12 further comprising transporting the block of ice from a first location to a second location.

14. The method of claim 12 wherein the fluid includes water and antifreeze.

15. The method of claim 12 wherein the step of gradually filling comprises partially filling the enclosure with water, allowing at least a top surface of the water to freeze, and then continuing to fill the enclosure with water.

16. A method of air conditioning, comprising:
    providing an enclosure having an insulating layer, a primary coil, a drain connected to a bottom interior surface of the enclosure and a return coil;
    receiving a block of ice delivered to the enclosure; and
    cooling air within a building.

17. A base for a cooling system using a block of ice for cooling, comprising:
    a support for supporting the block of ice within an insulating enclosure;
    a primary coil of tubing for contacting the block of ice beneath the block of ice and for transferring fluid;
    a return coil of tubing beneath the block of ice for transferring fluid; and
    a floor pan for collecting water beneath the primary coil and the return coil;
    wherein the water forms as the block of ice melts.

* * * * *